(12) United States Patent
Pattullo et al.

(10) Patent No.: US 9,567,944 B2
(45) Date of Patent: Feb. 14, 2017

(54) LAYERED DIAPHRAGM

(71) Applicant: WALBRO ENGINE MANAGEMENT, L.L.C., Tucson, AZ (US)

(72) Inventors: George M. Pattullo, Caro, MI (US); David L. Speirs, Cass City, MI (US)

(73) Assignee: WALBRO LLC, Tucson, AZ (US)

( * ) Notice: Subject to any disclaimer, the term of this patent is extended or adjusted under 35 U.S.C. 154(b) by 156 days.

(21) Appl. No.: 14/416,648

(22) PCT Filed: Jul. 25, 2013

(86) PCT No.: PCT/US2013/051986
§ 371 (c)(1),
(2) Date: Jan. 23, 2015

(87) PCT Pub. No.: WO2014/018723
PCT Pub. Date: Jan. 30, 2014

(65) Prior Publication Data
US 2015/0176533 A1   Jun. 25, 2015

Related U.S. Application Data

(60) Provisional application No. 61/779,903, filed on Mar. 13, 2013, provisional application No. 61/675,414, filed on Jul. 25, 2012.

(51) Int. Cl.
*F02M 17/04* (2006.01)
*F02M 17/34* (2006.01)
(Continued)

(52) U.S. Cl.
CPC .............. *F02M 17/04* (2013.01); *B32B 3/266* (2013.01); *B32B 5/022* (2013.01); *B32B 5/024* (2013.01);
(Continued)

(58) Field of Classification Search
CPC ................................ F02M 17/04; F02M 17/34
(Continued)

(56) References Cited

U.S. PATENT DOCUMENTS 3,758,093 A   9/1973   Bowditch
4,159,012 A   6/1979   Pizzuto et al.
(Continued)

FOREIGN PATENT DOCUMENTS

EP   1116873 A2   7/2001
JP   S49-102215 U   9/1974
(Continued)

OTHER PUBLICATIONS

Written Opinion & International Search Report for PCT/US2013/051986, mailed Nov. 12, 2013, 11 pages.
(Continued)

*Primary Examiner* — Robert A Hopkins
(74) *Attorney, Agent, or Firm* — Reising Ethington P.C.

(57) ABSTRACT

In at least some implementations, a carburetor has a metering system that controls fuel flow from a fuel source to an air-fuel passage. The metering system includes a metering diaphragm sealed to a body of the carburetor to at least partly define a metering chamber between the metering diaphragm and the body, and the metering diaphragm has a continuous layer and a discontinuous layer. The continuous layer is responsive to fluid pressure within the metering chamber and moves against the discontinuous layer to open a metering valve to allow fuel flow from the fuel source and into the metering chamber when said fluid pressure is below a reference pressure.

33 Claims, 7 Drawing Sheets

(51) Int. Cl.

| | | |
|---|---|---|
| B32B 5/02 | (2006.01) | |
| B32B 7/12 | (2006.01) | |
| B32B 15/06 | (2006.01) | |
| B32B 15/08 | (2006.01) | |
| B32B 15/14 | (2006.01) | |
| B32B 15/18 | (2006.01) | |
| B32B 25/08 | (2006.01) | |
| B32B 25/14 | (2006.01) | |
| B32B 27/08 | (2006.01) | |
| B32B 27/12 | (2006.01) | |
| B32B 27/30 | (2006.01) | |
| B32B 27/32 | (2006.01) | |
| B32B 27/36 | (2006.01) | |
| B32B 27/40 | (2006.01) | |
| B32B 3/26 | (2006.01) | |
| F02M 37/04 | (2006.01) | |

(52) U.S. Cl.
CPC ............ *B32B 7/12* (2013.01); *B32B 15/06* (2013.01); *B32B 15/08* (2013.01); *B32B 15/14* (2013.01); *B32B 15/18* (2013.01); *B32B 25/08* (2013.01); *B32B 25/14* (2013.01); *B32B 27/08* (2013.01); *B32B 27/12* (2013.01); *B32B 27/306* (2013.01); *B32B 27/32* (2013.01); *B32B 27/322* (2013.01); *B32B 27/36* (2013.01); *B32B 27/40* (2013.01); *F02M 17/34* (2013.01); *B32B 2260/021* (2013.01); *B32B 2260/046* (2013.01); *B32B 2307/20* (2013.01); *B32B 2307/50* (2013.01); *B32B 2307/546* (2013.01); *B32B 2307/714* (2013.01); *F02M 37/046* (2013.01); *Y10T 29/49117* (2015.01); *Y10T 29/49231* (2015.01)

(58) Field of Classification Search
USPC .......... 261/35, 36.1, 36.2, 38, 66, 72.1, DIG. 68, 261/DIG. 74
See application file for complete search history.

(56) References Cited

U.S. PATENT DOCUMENTS

| | | | |
|---|---|---|---|
| 4,271,093 A * | 6/1981 | Kobayashi | F02M 17/04 123/179.11 |
| 4,978,478 A | 12/1990 | Vonderau et al. | |
| 5,262,092 A | 11/1993 | Reeder et al. | |
| 6,000,369 A * | 12/1999 | Koizumi | F02M 17/04 123/179.16 |
| 6,017,199 A | 1/2000 | Yanaka | |
| 6,135,429 A | 10/2000 | Woody | |
| 6,340,294 B1 * | 1/2002 | Kubota | F04B 43/06 417/395 |
| 6,581,916 B1 | 6/2003 | Shaw | |
| 6,698,727 B1 | 3/2004 | Shaw | |
| 6,702,261 B1 | 3/2004 | Shaw | |
| 7,658,170 B2 | 2/2010 | Wada et al. | |
| 2002/0195726 A1 | 12/2002 | Galka et al. | |
| 2003/0015808 A1 | 1/2003 | Burns et al. | |
| 2008/0203344 A1 | 8/2008 | Cobb | |
| 2011/0067677 A1 | 3/2011 | Herzer | |

FOREIGN PATENT DOCUMENTS

| | | |
|---|---|---|
| JP | S51-29156 U | 3/1976 |
| JP | S54-141229 U | 10/1979 |
| JP | 2007239463 | 9/2007 |
| WO | WO2007054056 A1 | 5/2007 |
| WO | WO2008046719 A1 | 4/2008 |

OTHER PUBLICATIONS

Supplementary European Search Report and EPO Communication in corresponding EP patent application EP 13 82 3579 mailed May 4, 2016, 9 pages.

* cited by examiner

LAYERED DIAPHRAGM

REFERENCE TO CO-PENDING APPLICATIONS

This application claims the benefit of U.S. Provisional Application Nos. 61/675,414 filed Jul. 25, 2012 and 61/779,903 filed Mar. 13, 2013, which are incorporated herein by reference in their entirety.

TECHNICAL FIELD

The present disclosure relates generally to carburetors and fuel metering systems for use with carburetors.

BACKGROUND

Carburetors are devices that can be used to mix fuel with air to power combustion engines. A carburetor may include a fuel metering system that helps control the amount of fuel supplied to air flowing through the carburetor for mixing. Some metering systems employ a diaphragm that oscillates during operation to open and close a metering valve. The high number of cycles experienced by such diaphragms, when combined with physical interaction with other metering system components and continuous exposure to solvent-containing fuels, can result in a harsh operating environment that causes wear and degradation of the diaphragm.

SUMMARY

In at least some implementations, a carburetor has a metering system that controls fuel flow from a fuel source to an air-fuel passage. The metering system includes a metering diaphragm sealed to a body of the carburetor to at least partly define a metering chamber between the metering diaphragm and the body, and the metering diaphragm has a continuous layer and a discontinuous layer. The continuous layer is responsive to fluid pressure within the metering chamber and moves against the discontinuous layer to open a metering valve to allow fuel flow from the fuel source and into the metering chamber when said fluid pressure is below a reference pressure.

A method is also disclosed of making a carburetor having a fuel metering system with a metering diaphragm. The method includes the steps of providing a metering diaphragm having a conductive portion that is responsive to an electric field, a magnetic field, or both, and communicating with the conductive portion a source of an electric field, a magnetic field or both so that said electric field, magnetic field or both may be applied to the conductive portion.

At least some methods of making a carburetor including a diaphragm, may comprise the steps of forming an opening through a sheet of a first material, bonding a sheet of a different second material with the sheet of first material so that the second material overlies the formed opening, and clamping the bonded sheets between first and second carburetor bodies outside of the formed opening so that the second material moves in response to a fluid pressure differential on opposite sides of the bonded materials.

In at least some implementations, a carburetor includes first and second bodies, a fuel chamber located between the first and second bodies, and a multilayer subassembly clamped between the first and second bodies. The multilayer subassembly includes a first layer of material and a second layer of a different material bonded with the first layer of material. And a fuel flow valve opens and closes to allow fuel flow into or out of the fuel chamber. The first layer of material flexes to selectively actuate the fuel flow valve, and the second layer of material defines a portion of the fuel chamber and moves in response to a pressure differential across the second layer of material.

In at least some forms, a multilayer diaphragm provides a chamber sealing layer which may be continuous (e.g. formed without any voids therethrough or therein) and responsive to pressure differentials across it. The diaphragm may also include a discontinuous layer having one or more voids formed therein at and least partially or completely therethrough. The discontinuous layer, in at least certain implementations, may engage other components such as a valve, so that the continuous layer does not. The voids or other discontinuities in the discontinuous layer may increase the flexibility of the discontinuous layer. The discontinuous layer may be formed by one or more wires or other component(s) where the voids may simply be gaps or open spaces between adjacent portions of the wire or other component(s). That is, the discontinuous layer need not be a sheet (planar or otherwise) of material with one or more discontinuities therein. So one layer can seal off two chambers of the carburetor from each other and the other layer need not provide any such seal and can instead have other purposes. Further, the rate of movement of the diaphragm and/or its layers may be altered in different ways to control movement of the diaphragm and corresponding operation of the carburetor with which the diaphragm is used.

BRIEF DESCRIPTION OF THE DRAWINGS

The following detailed description of preferred embodiments and best mode will be set forth with reference to the accompanying drawings, in which.

DETAILED DESCRIPTION OF PRESENTLY PREFERRED EMBODIMENTS

As will become apparent from the following disclosure, a carburetor for providing fuel to a combustion engine may be equipped with a diaphragm, such as a metering diaphragm, that has an effective stiffness or resistance to movement that varies as a function of one or more factors. For example, the effective stiffness can vary with the amount of movement, flexing or deflection of the diaphragm, similar to a spring. To achieve this characteristic, the diaphragm may include a discontinuous layer that is attached at a periphery of a metering chamber. The diaphragm may also have a resistance to movement that is affected by the presence, application, and or magnitude of an electric or magnetic field. For example, the diaphragm may include a conductive portion across which a voltage may be applied to affect diaphragm movement or to which a magnetic field may be applied to affect diaphragm movement. Such conductive portions can be useful to monitor certain carburetor conditions and/or tune the carburetor during operation.

Figure 1:
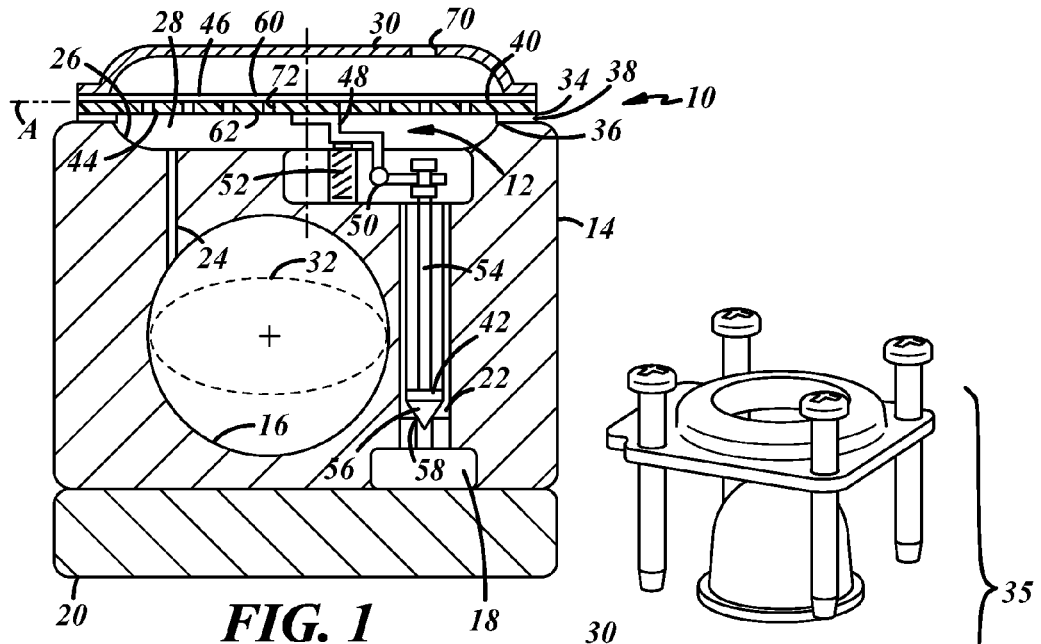
FIG. 1 is a schematic cross-sectional view of a carburetor with a diaphragm metering system, according to one embodiment.

Referring in more detail to the drawings, FIG. 1 is a cross-sectional view of a carburetor 10 with a diaphragm metering system 12. Many of the individual components and arrangement of components in FIG. 1 are shown schematically for illustration purposes—i.e., the cross-section does not necessarily represent a planar cross-section through an operable carburetor and may omit one or more carburetor components or features. The carburetor 10 includes a body 14 and an air-fuel passage 16 formed through the body. The body 14 supports the metering system 12, which is constructed and arranged to help control fuel flow from a fuel source 18 to the air-fuel passage 16. In this particular embodiment, the fuel source 18 is a passage that is in fluid communication with a pump chamber of an onboard fuel pump 20. The fuel pump 20 may be a diaphragm type fuel pump or any other type of fuel pump capable of providing and/or pressurizing fuel at fuel source 18. The fuel source 18 may simply be a port in the carburetor body arranged for connection with gravity-fed fuel, in a different embodiment.

In the illustrated embodiment, the carburetor body 14 includes fluid passages 22, 24 formed therein to accommodate fuel flow from the fuel source 18 to the passage 16 during carburetor operation. A recess 26 may also be provided in an outer surface of the carburetor body 14 to partly define a metering chamber 28 fluidly connecting the fluid passages 22 and 24. Skilled artisans will appreciate that the carburetor 10 may include other components or features such as a cover 30, a throttle valve 32 (shown as a dashed line in a partially open position), as well as other components not shown. For example, the carburetor may include one or more additional fluid passages, a choke mechanism, and/or an air purge mechanism, among other things. The illustrated passages are only representative and may each comprise multiple individually formed passages to allow fluid flow between respective portions of the carburetor.

The metering system 12 includes a metering diaphragm 40 and a metering valve 42. The metering diaphragm 40 has a chamber side 44 and an opposite reference side 46. The chamber side 44 and the carburetor body 14 together form the metering chamber 28. The metering diaphragm 40 is attached to the carburetor body 14 to form a fluid tight seal 34 about a periphery 36 of the metering chamber 28. In the example of FIG. 1, an optional gasket 38 is located about the periphery 36 to partly form the seal 34, and at least a portion of the diaphragm 40 is fixed at the periphery 36 between the carburetor body 14 and the cover 30. The cover 30 is optional and may include a port 70 formed therethrough to allow atmospheric or another reference pressure to act upon the reference side 46 of the diaphragm 40. The diaphragm 40 may be sealed to the body 14 by other means, such as a bead of adhesive or a weld at or about the periphery 36, and the seal 34 need not include both layers of the diaphragm along the entire periphery.

In operation, the metering diaphragm 40 moves in response to pressure differentials to actuate the metering valve 42. In the illustrated embodiment, a reference pressure (e.g., atmospheric pressure) acts upon the reference side 46 of the diaphragm 40, and fluid pressure in the metering chamber 28 acts upon the chamber side 44 of the diaphragm 40. As air flows from the atmosphere and through the passage 16 to be mixed with fuel on its way to the engine, the pressure in the air-fuel passage 16 and the metering chamber 28 falls below the reference pressure as fuel is delivered from the metering chamber to the passage 16. The diaphragm 40 deflects of flexes in a direction that decreases the volume of the chamber 28 to open the metering valve and allow fuel to flow from fuel source 18 and into the chamber 28 through passage 22. When the chamber pressure is equalized with and/or exceeds the reference pressure due to the newly introduced fuel in the metering chamber 28, the diaphragm 40 moves in the opposite direction, and the metering valve 42 closes until metering chamber pressure again falls below the reference pressure as fuel is provided to the air-fuel passage 16. Thus, every time a dose of fuel is delivered from the metering chamber 28 to the air-fuel passage 16, the metering valve 42 is opened to refill the metering chamber 28 then closed again until the next dose of fuel is delivered to passage 16.

In the embodiment of FIG. 1, the diaphragm 40 actuates valve 42 via the combined actions of various other components, including a metering lever 48, a pivot 50, a metering spring 52, and a stem 54. The valve 42 includes a valve body 56 and a valve seat 58 and may be a poppet valve as illustrated or any other type of valve. In the illustrated arrangement, diaphragm movement pivots the lever 48 about the pivot 50 in opposition to the spring 52 to move the valve body 56 away from valve seat 58. As the metering chamber pressure is equalized with the reference pressure and the diaphragm 40 moves in a direction away from the metering lever 48, the spring 52 acts to pivot the lever 48 in the opposite direction to reseat the valve 42. Skilled artisans will appreciate that this is only one example of components arranged to allow the diaphragm 40 to actuate valve 42. For example, the valve body 56 could move away from the valve seat 58 in a different direction, a different portion of the diaphragm 40 could contact the metering lever, etc.

The metering diaphragm 40 may serve several functions, such as, but not limited to, partly defining the metering chamber 28, flexing or otherwise moving in response to changing fluid pressure differentials across its opposite sides and/or physically contacting other metering system components. It also should be resistant to chemical attack from fuels. In one embodiment, such as that shown in FIG. 1, the metering diaphragm 40 is a layered diaphragm including layers 60 and 62. As will be described in further detail below, each layer of the layered metering diaphragm can be constructed from different materials and/or with different characteristics to together perform diaphragm functions.

Layer 60 of the diaphragm may be a continuous layer of flexible material responsive to the above-described fluid pressure differentials. As used here, a continuous layer is a layer that is uninterrupted by holes, apertures, openings, or other components extending therethrough. Layer 60 may also be described as a film or membrane and may be present at the seal 34 along the entire periphery 36 of the metering chamber 28. Layer 60 oscillates in response to metering chamber pressure changes whether or not additional diaphragm layers are employed and is constructed so that fuel cannot flow through it. Layer 62 of the diaphragm may be a discontinuous layer of material and may be provided to physically contact other metering system components (e.g., metering lever 48) to actuate the metering valve 42. As used here, a discontinuous layer is a layer of material through which or around which fuel can flow. For example, the discontinuous layer 62 may include one or more slots 72 or other openings formed at least partially therethrough. In some implementations, layer 62 is affixed to the carburetor body 14 along at least a portion of the periphery 36 of the metering chamber. By affixed it is not intended to mean only a direct connection such as by a fastener or adhesive, restricting movement of a part of the layer relative to the carburetor body is sufficient which may be done in many ways such as simply holding the layer against the carburetor body, clamping it against the body with another component or otherwise restricting movement of a part of the layer relative to the carburetor body.

The metering diaphragm 40 may be constructed so that one of the individual layers 60, 62 is configured to perform certain diaphragm functions without regard for other diaphragm functions, while the other one of the individual layers 60, 62 is configured to perform other diaphragm functions. For example, continuous layer 60 may be constructed as a thin, flexible membrane layer that quickly responds to metering chamber pressure changes without regard for its ability to endure a product lifetime of wear where the diaphragm 40 physically contacts and/or moves against other metering system components. Likewise, the discontinuous layer 62 may be constructed as a wear-resistant element that is capable of withstanding a product lifetime of physical contact and/or movement against other metering system components without regard for its ability to quickly respond to metering chamber pressure changes or to form a seal at the interface between the diaphragm 40 and the body 14 on its own. Of course, the continuous layer 60 may employ wear-resistant materials, and the discontinuous layer element 62 may be made from membrane-like materials. Particular non-limiting examples of metering diaphragms having multiple layers will be described below.

Figure 2:
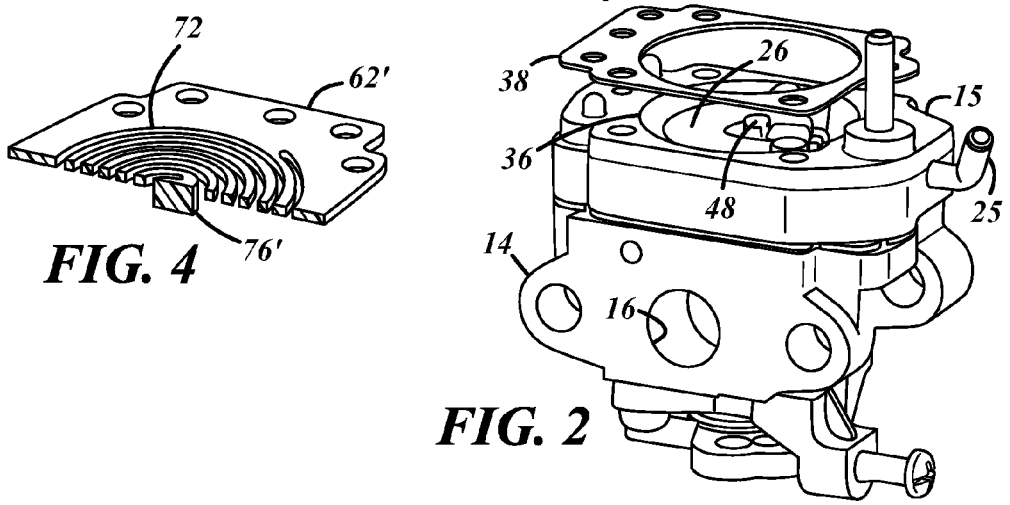
FIG. 2 is a partially exploded view of one embodiment of a carburetor with a layered metering diaphragm.

FIG. 2 is a partially exploded view of a carburetor 10 with a metering system 12, according to one embodiment. Carburetor 10 includes a main body 14, through which the air-fuel passage 16 is formed, and an intermediate body 15 connected to the main body 14. In this particular embodiment, a diaphragm-type fuel pump (hidden from view) is provided between bodies 14 and 15 and provides the fuel source for metering system 12. Alternatively, the fuel pump may be omitted and fuel line connector 25 may act as the fuel source for the metering system under gravitational pressure. A recess 26 formed in the intermediate body 15 defines part of the metering chamber. Recess 26 is fluidly connected to the air-fuel passage 16 via one or more passages in each of the bodies 14, 15. This embodiment also includes an air purge system 35 for removing air from the metering chamber and priming the carburetor with fuel for start-up. Though the particular cover 30 shown in FIG. 2 may include various arrangements of valves and passages as part of the air purge system 35, it is similar to the cover 30 of FIG. 1 in that it covers the metering diaphragm 40 and forms a cavity or reference chamber between itself and the diaphragm 40 that resides at a reference pressure (e.g., atmospheric pressure).

The illustrated metering diaphragm 40 includes a continuous layer 60 and a discontinuous layer 62. Each layer 60, 62 spans across or extends over recess 26 and is shaped so that each layer 60, 62 is present at the seal formed at the periphery 36 of the metering chamber in this implementation. Both of the layers 60, 62 are fixed between the cover 30 and the body 14 along the entire periphery 36 of the metering chamber in this embodiment, and each layer extends outside of the periphery 36 to accommodate various through-holes and/or locating features 74 and to provide a portion of the diaphragm for clamping between the body 14 and the cover 30. A similarly shaped gasket 38 is also provided in this example, but is not always necessary.

The continuous layer 60 may be constructed from a polymeric film or sheet material. Suitable materials for the continuous layer may include polytetrafluoroethylene (e.g., Dupont Teflon), polyesters (e.g., Dupont Mylar), fluoroelastomers (e.g., Dupont Viton), low density polyethylene (LDPE), nitrile rubber (e.g., Parker N1500-75), or polyurethanes such as TPUs, though other materials may be utilized. Material selection may be based on numerous factors such as resistance to the particular fuels used with the carburetor (e.g., gasoline, ethanol, and mixtures thereof), cost, and ease of forming. Where layer 60 is a continuous layer, material choices are not limited to known diaphragm materials that are sometimes selected partly for their ability to accommodate a through-hole and form a seal at the through-hole with a contact element that extends therethrough. Though woven materials or other types of textile fabrics impregnated with elastomeric materials may be used for continuous layer 60, these types of composite materials are not necessary. In one embodiment, layer 60 is a continuous layer of non-woven polymeric material. In another embodiment, layer 60 is a homogeneous layer of polymeric material.

Depending on material stiffness and other factors, the continuous layer 60 may have a thickness in a range from about 0.001" to about 0.010". Generally, a thinner continuous layer 60 will be more responsive to pressure changes in the metering chamber for a given material, but the layer should also be sufficiently thick to endure cyclic fatigue and to have sufficient integrity to move the discontinuous layer 62 during operation. In one particular embodiment, the continuous layer 60 is formed from a sheet of TPU material having a generally uniform thickness in a range from about 0.001" to about 0.005", or about 0.003" on average. The continuous layer 60 may be die-cut from sheet stock material, injection molded, or otherwise formed.

Figure 3:
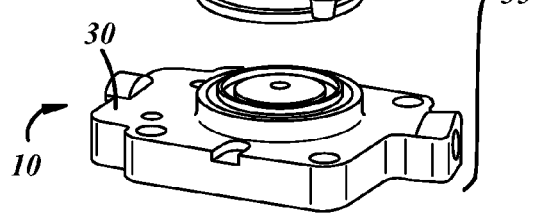
FIG. 3 is an alternative embodiment of a continuous layer of the metering diaphragm of FIG. 2, including a bagged portion.
Figure 3:
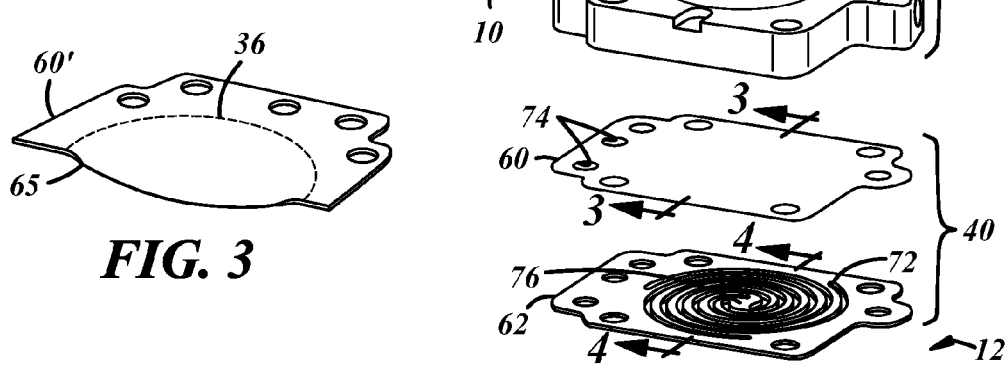

With reference to FIG. 3, another embodiment of the continuous layer 60' includes a bagged portion 65 located within the periphery 36 of the metering chamber. The bagged portion 65 is characterized by a thickness that is less than the nominal thickness of the layer (e.g., the thickness in the region surrounding the bagged portion 65) and/or an increased surface area compared to the same region of the layer if it was flat. The overall range of movement of layer 60 may also be increased when configured with a bagged portion.

The bagged portion 65 can be formed in layer 60 by controlled stretching of the layer 60 before or after assembly. For example, after assembly, the metering chamber of the carburetor may be sealed-off by closing any valves along fluid passages connecting the metering chamber to other portions of the carburetor, and the metering chamber may be pressurized to a level sufficient to plastically deform the continuous layer 60. The pressurization may be positive or negative. In one embodiment, a bagged portion is formed in the continuous layer of the metering diaphragm in this manner, and may be formed during metering chamber leak testing, for example. This technique may be used to form the bagged portion in the continuous layer even in the absence of additional diaphragm layers. Similar fluid pressure stretching or mechanical stretching of the continuous layer may be performed prior to assembly as well.

Referring again to FIG. 2, layer 62 is a discontinuous layer in this implementation, including one or more discontinuities such as voids (e.g. slots) 72 formed at least partially therethrough. The voids or other discontinuities can be formed fully through the layer 62 or only partially through resulting in portions of the layer 62 having different thickness than other portions. In this particular example, three individual slots are included through layer 62 in a spiral pattern surrounding a centrally located contact portion 76. The contact portion 76 is the portion of diaphragm 60 that physically contacts other metering system components such as the metering lever 48. The slots 72 are provided to allow the discontinuous layer 62 to more easily deflect. In other words, without the slots 72, layer 62 may be too stiff to move with the continuous layer 60 to actuate the metering valve because it may be configured to have sufficient strength and integrity to endure continuous cycling and contact with the metering lever 48. The slots 72 can be arranged in any manner that allows at least the contact portion 76 of layer 62 to move freely with the continuous layer 60 when it responds to pressure changes in the metering chamber. In one embodiment, each of the layers 60, 62 has a range of movement of about 2.0 mm or more from a planar datum A, datum A being located between and generally parallel with flat portions of layers 60, 62 at the periphery of the metering chamber 28 (shown best in FIG. 1).

The discontinuous layer 62 can be configured to provide the diaphragm 40 with any desired resistance to movement by configuring the slots 72 accordingly. For example, for a discontinuous layer 62 with spiral slots, the spiral arms (i.e., the material between the slots) may be designed longer or shorter to respectively decrease or increase the resistance to movement of the discontinuous layer 62 and the diaphragm 40 as a whole. This resistance to movement can be expressed in terms of force per unit distance, such as N/mm or lbs/in, much like a spring. In one embodiment, the metering system includes a metering spring, and a characteristic spring rate or effective stiffness for the discontinuous layer is about 50% of the spring rate of the metering spring or less. In another embodiment, the characteristic spring rate of the discontinuous layer is about 25% of the metering spring rate or less. These relatively low characteristic spring rates can help minimize the effect that other variables such temperature, age, fuel type, manufacturing tolerances, etc. have on the overall performance of the carburetor so that the metering spring remains largely responsible for metering system performance.

The discontinuous layer 62 of the diaphragm may be constructed from nearly any material, including plastic or metal materials. Suitable materials for layer 62 may include polyacetal (e.g., Dupont Delrin), polyester (e.g., Dupont Mylar), or stainless steel, though other materials may be utilized including combinations of metal and plastic in some cases. Material selection may be based on numerous factors such as fuel resistance and wear resistance, to name a few. Depending on material stiffness, slot configuration, and/or other factors, layer 62 may have a thickness in a range from about 0.003" to about 0.040". For example, a plastic discontinuous layer 62 may be generally thicker than the continuous layer 60, ranging from about 0.005" to about 0.040" thick. In one embodiment, layer 62 is a discontinuous layer that has a thickness in a range from about 0.015" to about 0.025", or about 0.020" nominal. When constructed with stiffer metal materials, the thickness of layer 62 may be less than with plastic materials, such as from about 0.003" to about 0.015". Of course, the configuration of the slots 72 in layer 62, when included, may affect these non-limiting ranges.

Figure 4:
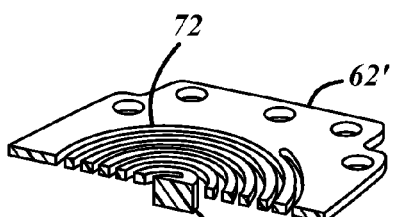
FIG. 4 is an alternative embodiment of a discontinuous layer of the metering diaphragm of FIG. 2, including a contact portion with a protrusion.
Figure 4:
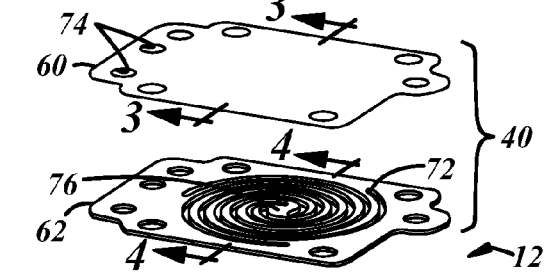

Layer 62 may be die-cut, laser-cut, injection molded, stamped, or otherwise formed. In some embodiments, including that shown in FIG. 2, the outer perimeter of both of layers 60 and 62 may have the same overall shape, and each may include one or more corresponding locating features and/or through-holes 74 that line up with corresponding features on the carburetor body 14 and/or with the gasket 38 where provided. In one particular embodiment, illustrated in FIG. 4, the discontinuous layer 62' includes a protrusion 76' at the contact portion of the layer. The protrusion 76' may be integrally formed in the same piece of material as the rest of the layer 62' (e.g., by injection molding in plastic or by stamping a proud feature in metal) or may be a separately attached piece. This type of configuration simulates a "button" feature and may allow for a metering lever 48 that is simpler with less bends formed therein.

Layered metering diaphragms such as those described above can allow diaphragm materials to be selected according to their respective functions for improved performance while additionally simplifying and/or lowering the cost of manufacturing metering diaphragms over conventional metering diaphragm constructions. For example, the continuous layer 60 does not necessarily require a hole to be formed therethrough for attachment of other metering system components, thus reducing the initial and long-term likelihood of fuel leaks through the diaphragm. In fact, the two diaphragm layers 60, 62 need not be attached together at all. While the layers 60, 62 may be optionally attached together, configuring layer 62 to be attached at the periphery of the metering chamber allows it to be separate from the continuous layer 60, at least in the region of the contact portion 76 of layer 62. Affixing the discontinuous layer 62 at the periphery of the metering chamber may also allow for the use of metering springs with relatively low spring constants, thereby allowing for a metering system that is more sensitive to pressure differentials. In other words, where a metering spring is employed (e.g., metering spring 52 in FIG. 1) it need only provide enough biasing force to return the metering lever to its home position to close the metering valve. Some other types of metering systems require additional biasing force to hold the metering valve closed against the weight of a heavy contact element while the carburetor is not operating. These are but a few of the possible benefits of layered metering diaphragms, and skilled artisans will realize others.

In one embodiment, the metering spring may be omitted altogether, and the discontinuous layer can provide the biasing force for the metering lever or other metering system component to keep the metering valve closed. In this embodiment, the metering lever or other metering system component may be attached to the metering diaphragm so that diaphragm movement is translated directly to the attached metering system component to open and close the metering valve. In this case, the characteristic spring rate of the discontinuous layer may be about the same or higher than the spring rate of a conventional metering spring. In some of the embodiments described below, where an electric or magnetic field is employed to affect diaphragm movement, a higher effective spring rate for the discontinuous layer may allow for higher resolution control of diaphragm movement (i.e., for a given change in electric or magnetic field, the corresponding change in the diaphragm movement is less with a stiffer discontinuous layer).

Figure 5:
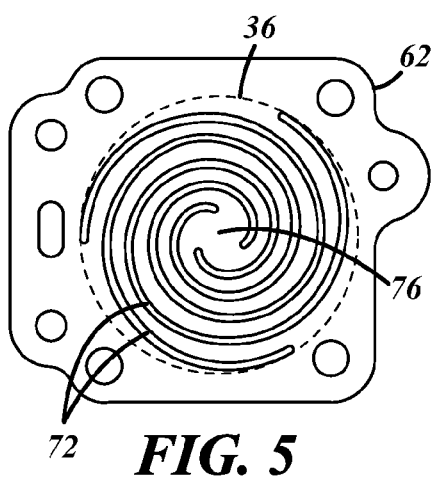
FIG. 5 is a plan view of the discontinuous layer of the metering diaphragm of FIG. 2.

As shown by example in FIGS. 5-23, discontinuous layers of various configurations may be employed to affect diaphragm movement. FIG. 5 shows the discontinuous layer 62 from FIG. 2 in plan view with the three spiral slots 72 formed therethrough and arranged in a pattern about the central contact portion 76. When assembled as part of a metering diaphragm as described above, the continuous layer applies a force to the discontinuous layer 62 and moves the contact portion 76 in a direction to actuate the metering valve. The contact portion 76 of layer 62 moves out of plane from the remainder of the layer 62 in the manner of a variable diameter coil spring and can move in the opposite direction when metering chamber pressure is increased by incoming fuel.

Figure 6:
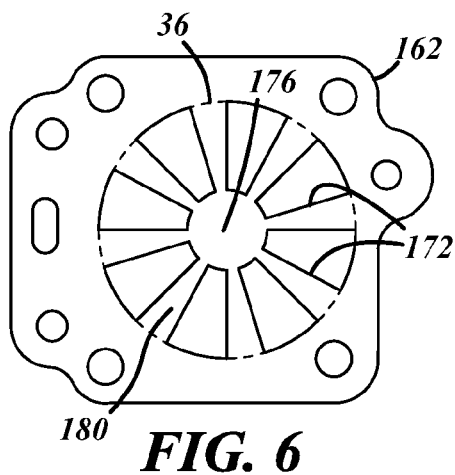
FIG. 6 is a plan view of another embodiment of a discontinuous layer, including radial slots.

Referring to FIG. 6, another embodiment of a discontinuous layer 162 is shown with a plurality of radially oriented slots 172 formed therethrough. As with the three-slotted spiral configuration of FIG. 5, slots 172 are arranged in a pattern about the contact portion 176 for even load distribution across the layer 162 during deflection. This configuration may also be described as having a plurality of spokes 180 extending radially outward from the contact portion 176 within the intended periphery 36 of the metering chamber.

Figure 7:
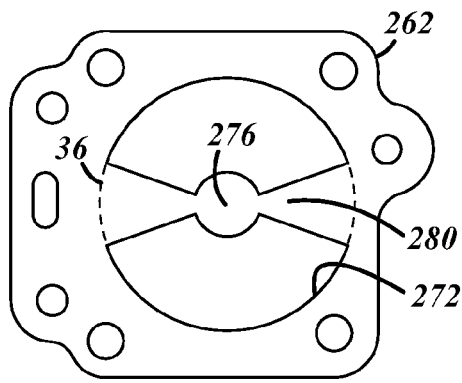
FIG. 7 is a plan view of another embodiment of a discontinuous layer, included arc-shaped slots.

FIG. 7 illustrates another example of a discontinuous layer 262. This embodiment includes a pair of larger arc-shaped slots 272 arranged in a symmetric pattern about the contact portion 276. In this embodiment, a majority of the area of the discontinuous layer 262 within the intended periphery 36 of the metering chamber is slotted or open area. This configuration may also be described as having a pair of spokes 280 extending radially outward from the contact portion 176. Described differently, the discontinuous layer 262 may be a layer of material having a cut-out 272 that corresponds with the intended periphery 36 of the metering chamber and a strip of material 280 spanning the cut-out from one side to the other. The strip of material may span the cut-out at a location that does not pass through the center of the cut-out, as well, depending on the corresponding location of other metering system components.

Figure 8:
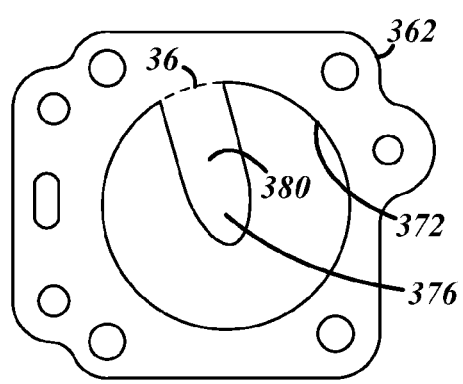
FIG. 8 is a plan view of another embodiment of a discontinuous layer, including a C-shaped slot.

Turning to FIG. 8, another embodiment of a discontinuous layer 362 is shown. In this embodiment, a single slot 372 occupies most of the area within the intended periphery 36 of the metering chamber and is generally C-shaped. This configuration may also be described as a layer of material having a cut-out 372 that corresponds with the intended periphery 36 of the metering chamber and a segment of material 380 extending from an edge of the cut-out 372 toward the interior of the metering chamber and ending at contact portion 376. In another embodiment, the discontinuous layer may include of a segment of material extending from the periphery of the metering chamber toward the interior of the metering chamber, and the layer does not necessarily include other portions that surround the metering chamber at its periphery. As illustrated in FIG. 8, the open areas of the discontinuous layer need not be arranged symmetrically or in any repeating pattern, and solid portions of the discontinuous layer need not extend all the way across the metering chamber in order to realize one or more of the benefits of these teachings.

Metering diaphragms may also be configured to selectively affect metering system component movement through means other than metering spring stiffness, metering lever positioning, or the characteristic spring rate of the discontinuous layer. For example, electric and/or magnetic fields can be employed to affect metering diaphragm movement with certain embodiments of layered metering diaphragms. Similar arrangements may be used to monitor diaphragm movement or other carburetor operating characteristics, as well. As will become apparent below, affecting diaphragm movement by application of electric or magnetic fields may be accomplished whether or not the metering diaphragm has a layered construction.

Figure 9:
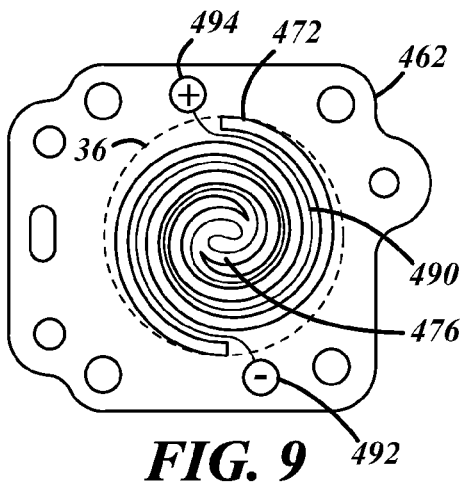
FIG. 9 is a plan view of another embodiment of a discontinuous layer, including a conductive path.

Referring to FIG. 9, one embodiment of a discontinuous layer 462 that can be affected by an electric and/or magnetic field during operation is illustrated. Dual spiral slots 472 are formed through layer 462 within the intended periphery 36 of the metering chamber in this example. Layer 462 also includes a conductive portion 490, which in this case is a conductive path. In this embodiment, the conductive path 490 is in the form of electrically conductive traces at a surface of the layer, arranged between the spiral slots 472. Such traces may be included as part of the discontinuous layer 462 in various forms. In one example, stamped metal traces or pre-formed wires are molded into an otherwise plastic discontinuous layer. In another example, the conductive path is formed by selective masking and plating or by some other form of metal deposition. The conductive path 490 may lie at the surface of one side of the layer 462, extend through the layer so that it is present at both sides of the layer 462, or be at least partly encapsulated between the opposite surfaces of the layer 462. The conductive path 490 is preferably insulated from the carburetor body when assembled, though one end of the path such as end 492 may be in electrical contact with the carburetor body as a voltage reference point or ground. One or both ends 492, 494 may be configured to accommodate electrical connections.

This and other embodiments of discontinuous layers that include a conductive portion may be useful for a variety of metering system control and/or monitoring techniques. For example, an electric field in the form of a voltage potential may be selectively applied across ends 492, 494 of the conductive path 490, thereby imparting the discontinuous layer 462 with a different resistance to movement (i.e., characteristic spring rate) than when no voltage potential is applied. The different voltage-induced spring rate may arise through various mechanisms such as localized interaction among electromagnetic fields surrounding the conductive path where different portions of the path run adjacent to one another. Applied voltage may be in one or more steps (e.g., on or off) or continuously variable and may be monitored by a vehicle control system or fuel system controller for selective application and adjustment.

A voltage potential applied to the conductive path 490 may also serve as a metering system heat source—i.e., the conductive path may act as a resistance heater. Controlled heating of the discontinuous layer in this manner may also affect the characteristic spring rate of the discontinuous layer and thus its resistance to movement in response to movement of the continuous layer. For example, a plastic discontinuous layer including a conductive path 490 such as that shown in FIG. 9 may have its effective stiffness reduced or otherwise changed by having its temperature increased through resistance heating via the conductive path 490.

Electrical connections at ends 492, 494 may also be used to monitor one or more characteristics of the metering system. For example, the conductive path 490 may include a sufficiently thin layer of conductive material so that it acts as a strain gauge for the discontinuous layer 462. Thus, movement of the discontinuous layer 462 and/or corresponding metering system components may be monitored in real-time when connected to a vehicle or fuel system controller. In another embodiment, the conductive path 490 includes more than one layer of conductive material including different types of conductive materials in different layers. This type of configuration may be used as a temperature sensor or as an additional way to affect the characteristic spring rate of the discontinuous layer when a voltage potential is applied.

In another implementation, the electrical resistance and/or capacitance of the conductive portion of the discontinuous layer may be measured and could be used to help determine certain fuel characteristics in the metering chamber. This is a variation of applying a voltage potential across the conductive portion, though the voltage may be of a different magnitude than that applied for purposes of heating or changing the characteristic spring rate of the discontinuous layer. Resistance or capacitance measurements obtained in this manner could be used to determine whether liquid or vapor is present in the metering chamber or could be correlated to percentage of ethanol composition, for example.

In yet another embodiment, the conductive portion 490 includes a ferromagnetic material, so that the movement of the discontinuous layer 462 is responsive to a magnetic field provided by a magnetic field source such as a magnet or an electromagnet. The conductive portion in this case may include a ferromagnetic grade of stainless steel, for example. In this case, the discontinuous layer does not necessarily include a discrete conductive path and may instead be made from a material such as an appropriate stainless steel or an iron-filled plastic material. In either case, the magnetic field source may be included as part of the carburetor at a location such that the discontinuous layer operates at least partly within the magnetic field emanating from the source. In one embodiment, an electromagnet is attached to a diaphragm cover (such as cover 30 of FIG. 1). The electromagnet may be energized by an applied voltage and/or the magnetic field that it produces may be variable to variably affect the movement of the discontinuous layer. For example, a stronger magnetic field present at the reference side of the metering diaphragm may cause the discontinuous layer to have a higher resistance to movement toward the metering lever when in the presence of a weaker or no magnetic field. In another embodiment, the magnetic field may be selectively applied to the metering diaphragm to uncork the metering valve during start-up.

Figure 10:
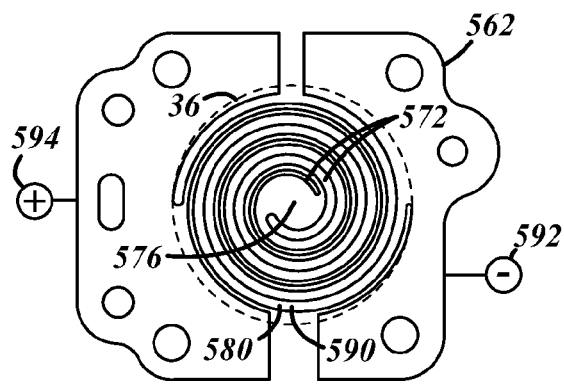
FIG. 10 is a plan view of another embodiment of a discontinuous layer, including a differently configured conductive path.

FIG. 10 illustrates another example of a discontinuous layer 562 including spiral slots 572 of different sizes and a conductive path 590 in the form of two spiral arms 580 that extend in a spiral pattern from opposite sides of the intended periphery 36 of the metering chamber toward the contact portion 576. In this example, the spiral arm extending from one side (the right side in FIG. 10) of the intended periphery 36 is wider than the spiral arm extending from the opposite (left) side. The overall spiral pattern thus includes alternating wide and narrow portions radially between the intended periphery of the metering chamber 36 and the contact portion 576.

When a voltage potential is applied across the conductive path 590, the resulting current flow through the interlaced wide and narrow portions of the spiral may be such that adjacent portions of the conductive path 590 (separated by slots 572) carry current in opposite directions from each other. This induces opposing magnetic fields in adjacent portions of the conductive path 590. Combined with the different stiffness of each adjacent portion, due to the different widths, a twisting or skewing effect may result, wherein the spiral arms 580 twist out of plane and cause the contact portion to move out of plane as well. This is an example of an electric field being employed to affect diaphragm movement in a manner somewhat different than by affecting the characteristic spring rate of the discontinuous layer. This type of diaphragm movement in response to induced magnetic fields may be useful to change the position of the discontinuous layer even when the carburetor is not operating to provide fuel to the engine. For example, this type of diaphragm movement could be used to uncork the metering valve at start-up or as an alternative or addition to traditional primer assemblies. The characteristic spring rate of the discontinuous layer 562 may also be affected by voltage application.

These and other layered metering diaphragm configurations may be used together with selective application of both electric and magnetic fields to monitor and/or tune a layered metering system without the need to disassemble the carburetor to do so. In one example, a conductive portion of the discontinuous layer comprises a ferromagnetic material, and the carburetor includes a magnetic field source that can selectively and/or variably provide a magnetic field in which the metering diaphragm operates. The movement of the diaphragm is monitored during carburetor operation by monitoring the change in resistance of the conductive path. A voltage potential is selectively applied across the conductive path and/or the magnetic field source is selectively applied to affect the movement of the diaphragm.

A monitoring or control system need not be a complex electronic or computer-based system in order to realize any of the benefits of these field-affected metering diaphragms. In some cases, it may be preferable that a voltage potential applied across the conductive path be directly user-adjustable by a dial-type potentiometer or other means so that the user can affect the carburetor air-fuel ratio, for example, during engine operation and tune the metering system for the particular operating conditions at the time of use. In some cases, no voltage potential is applied to the diaphragm during normal operation and the conductive path is provided as a diagnostic tool that can allow a user or technician to check the operation of the metering system without disassembling the carburetor. Skilled artisans will of course recognize other benefits associated with these and other embodiments. In addition, it is noted that one or more conductive portions may be included as any part of the metering diaphragm to affect diaphragm movement or for use in monitoring diaphragm movement or other carburetor conditions and are not limited to discontinuous layers or to layered diaphragm constructions.

FIGS. 11-14 illustrate other variations of discontinuous layers that may be used with or without conductive portions as part of a metering system diaphragm. The discontinuous layer 662 of FIG. 11 includes contact portion 676 and four segments 680 extending radially from the contact portion to the intended periphery 36 of the metering chamber. The segments 680 are equally circumferentially spaced (one every 90 degrees) about the central contact portion 676 forming four identical slots 672 between pairs of segments. Each segment 680 forms a serpentine-like shape, with a generally uniform segment width extending back and forth along gradually larger arcuate portions from the contact portion 676 to the intended periphery 36. Of course, the segment widths could vary if desired.

Figure 11:
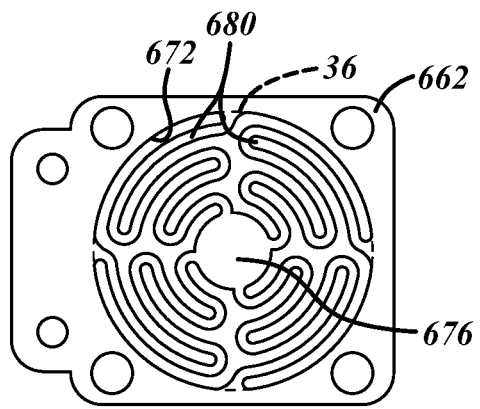
FIGS. 11-14 are plan views of various other discontinuous layers.
Figure 12:
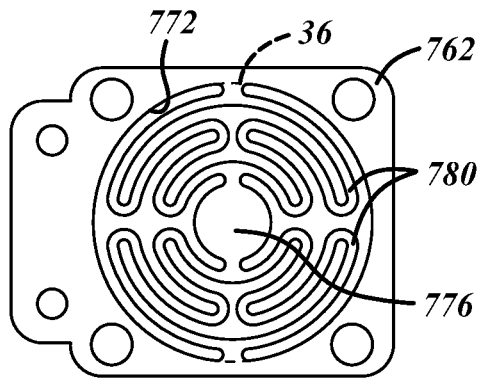

FIG. 12 illustrates a discontinuous layer 762 with a contact portion 776 and two segments 780 extending radially from the contact portion to the intended periphery 36. The segments 780 are similar to the segments 680 of FIG. 11 in their serpentine-like shape, except every other segment 680 of FIG. 11 is turned upside-down in plan view and merged with an adjacent segment to arrive at the segments 780 and slots 772 of FIG. 12.

Figure 13:
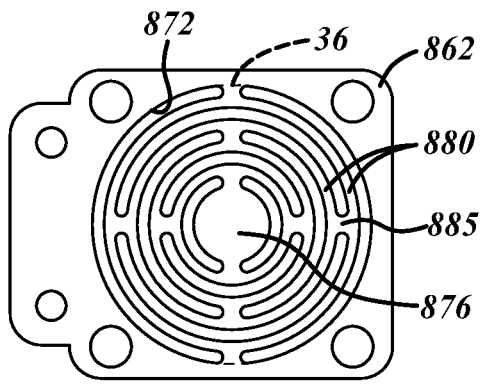

FIG. 13 illustrates a discontinuous layer 862 with a contact portion 876 and four concentric ring-shaped segments 880 joined by bridge portions 885. Bridge portions 885 between radially sequential segments 880 are offset 90 degrees from one another, resulting in radially sequential arcuate slots 872 that are offset 90 degrees from one another.

Figure 14:
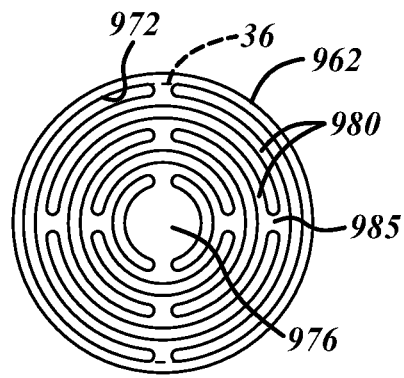

FIG. 14 illustrates a discontinuous layer 962 with a contact portion 976, segments 980, and slots 972 the same as those in FIG. 13. The illustrated discontinuous layer 962 does not include as much excess material outside the intended periphery 36, as the embodiment of FIG. 13, however, and does not include openings that coincide with locator features of the carburetor body. Layer 962 includes only enough material outside the intended periphery 36 to clamp between the carburetor body and cover 30 (shown in FIG. 1, for example). Optionally, the entire layer 962 lies within the metering chamber and is attached in some manner other than being clamped between the body and cover. Any of the previously described discontinuous layers can be shaped similarly so that they can be assembled in any angular orientation about their respective centers.

Figure 15:
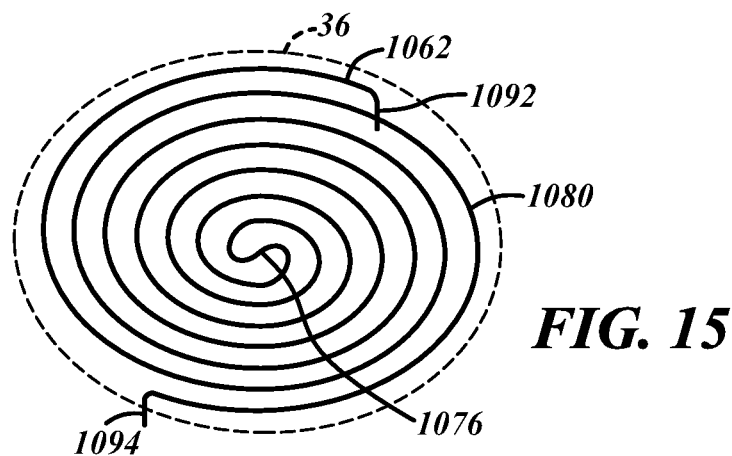
FIG. 15 is a perspective view of another embodiment of a discontinuous layer that includes a wire form.

FIG. 15 illustrates another implementation of a discontinuous layer 1062. This example is made in a continuous wire form 1080, with the ends 1092 and 1094 of the wire form each including a bend to fit in corresponding openings of the carburetor body at the periphery of the metering chamber. The wire form 1080 is in an interlaced dual-spiral shape, extending and spiraling radially inward from end 1092 to a central contact portion 1076 and radially outward from the contact portion to end 1094. This wire form configuration may offer certain cost advantages due to less material waste than with stamping operations. The circular or otherwise rounded cross-section of the wire form 1080 is also free from sharp edges that may sometimes be present in pieces stamped from sheets of material, making the wire form configuration less likely to abrade or otherwise damage the continuous layer of the diaphragm where the two layers contact each other. The wire form 1080 may use any suitable gauge wire in any suitable material. In one implementation, the wire form 1080 is formed from metal wire having a diameter in a range from about 0.1 mm to about 1.2 mm. The wire may be made from stainless steel, a shape memory alloy (e.g. nitinol), or any other suitable material. The wire form 1080 can be generally flat as shown, with or without bends at the ends 1092, 1094. Or the wire form 1080 may be formed so that the wire extends both radially and axially between the contact portion 1076 and the ends 1092, 1094.

Figure 16:
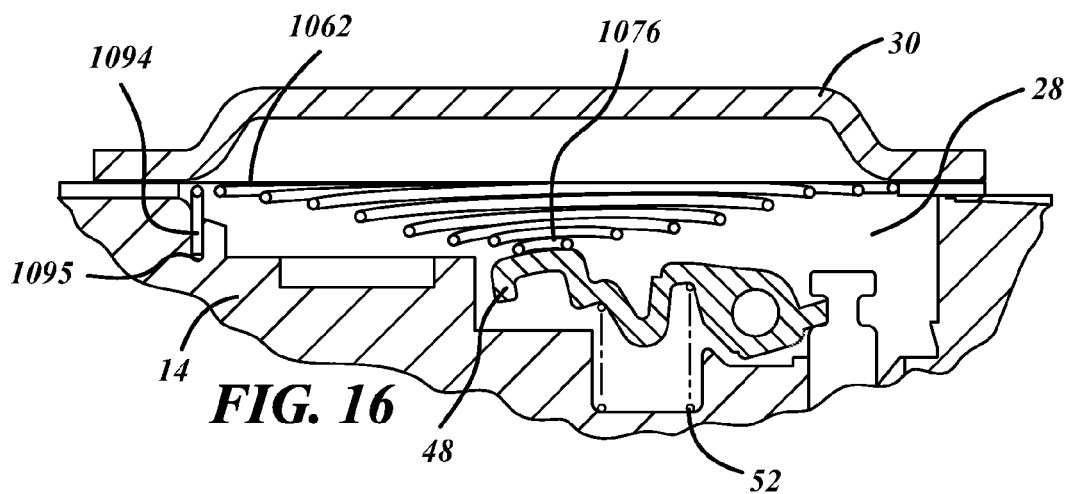
FIG. 16 is a partial cross-sectional view of a carburetor including the discontinuous layer of FIG. 15.

FIG. 16 shows the discontinuous layer 1062 of FIG. 15 assembled as part of a carburetor metering system. The continuous layer is omitted for clarity, and the discontinuous layer 1062 is shown at a low metering chamber pressure condition, where the diaphragm is deflected toward the carburetor body 14. FIG. 16 also shows one example of how an end 1094 of the wireform 1080 may fit within a blind bore 1095 in the carburetor body at the periphery of the metering chamber 28. When constructed from a conductive material and/or when constructed to include a conductive portion, the effective spring rate or resistance to movement of layer 1062 may be affected by application of an electric or magnetic field as described above.

Figure 17:
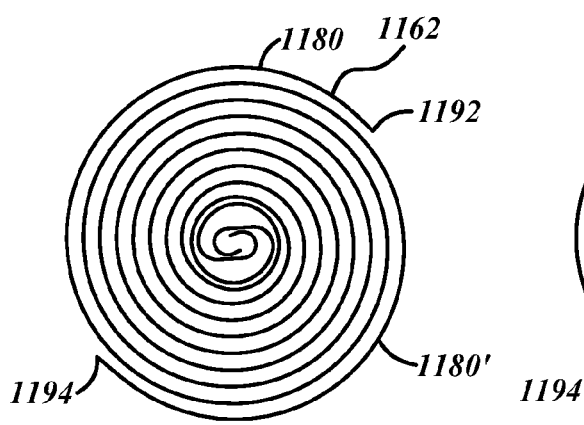
FIGS. 17-23 depict additional embodiments of discontinuous layers including wire forms.
Figure 18:
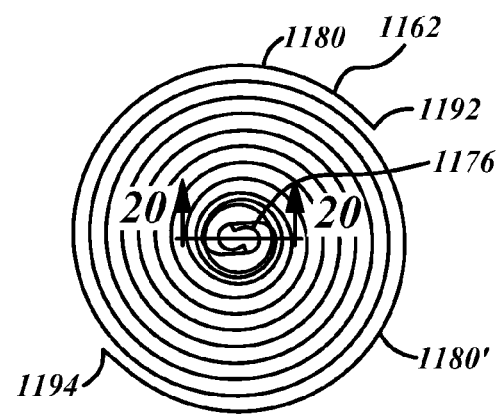
Figure 19:
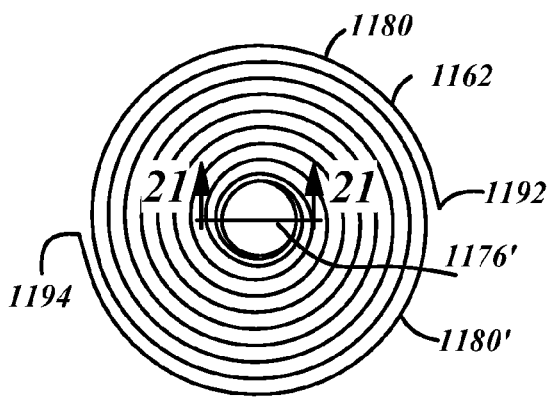

FIGS. 17-23 illustrate other wire form versions for the discontinuous layer of the diaphragm. FIG. 17 illustrates an example of a discontinuous layer 1162 made from two separate wire forms 1180, 1180'. Each wire form is spiral-shaped, extending radially from respective ends 1192 and 1194 toward a central contact portion (omitted in FIG. 17 for clarity) where each wire form 1180, 1180' ends. FIGS. 18 and 19 illustrate two examples of fasteners with contact portions 1176 and 1176' that may function to hold the two wire forms 1180, 1180' together.

Figure 20:
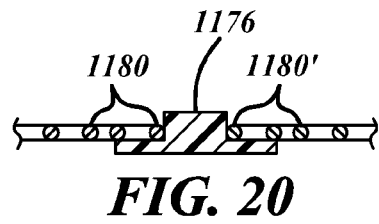

The example of FIG. 18 includes a fastener with a contact portion 1176, the fastener having an S-shaped post for each wire from 1180, 1180' to wrap partly around and/or snap into as shown. FIG. 20 is a cross-sectional view taken through the contact portion 1176 of FIG. 18. The fastener may be a molded plastic piece, such as acetal, or can be made from any other suitable material.

Figure 21:
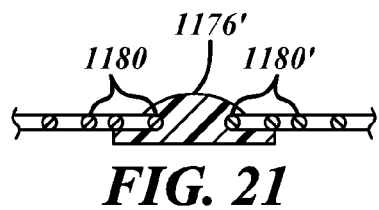

The example of FIG. 19 includes a fastener with a contact portion 1176', the fastener being in the form of a rivet, as shown in the cross-sectional view of FIG. 21. A solid rivet is shown, but a hollow rivet could be used instead. A metal rivet may be preferred in embodiments where electrical contact is desired at the contact portion from electrical continuity between the ends 1192, 1194. Other variations of the examples of FIGS. 17-19 include the use of different gauge wire, a different material, or different shapes for each separate wire form 1180, 1180', any of which may affect diaphragm movement either with or without an applied electric or magnetic field. The fastener joining the wire forms 1180, 1180' could also be insert-molded plastic, heat-staked plastic, sonic or ultrasonic welded pieces, or snap-together pieces, to name a few examples.

Figure 22:
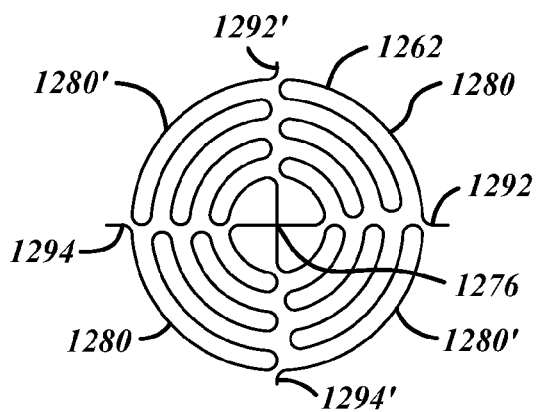

FIG. 22 illustrates another example of a discontinuous layer 1262 made from two separate wire forms 1280, 1280'. Together, the wire forms 1280, 1280' are similar in shape to the segments 680 of FIG. 11. Each wire form 1280, 1280' has a serpentine-like shape beginning at a first end 1292, 1292', extending back and forth along gradually smaller arcuate portions radially toward the central contact portion 1276, and then extending back and forth along gradually larger arcuate portions radially toward the intended periphery and a second end 1294, 1294'. The two separate wire forms 1280, 1280' can be identical shapes and may be joined at the contact portion 1276 by a spot weld, a clip, or other fastener. In this example, the ends of the wire forms do not include bends, but extend slightly beyond the intended periphery of the metering chamber where they may fit into complimentary slits or slots formed in the continuous layer and/or the gasket about the periphery of the chamber. The two wire forms 1280, 1280' may have different wire gauges, different materials, or be different shapes (e.g. a different number of arcuate portions).

Figure 23:
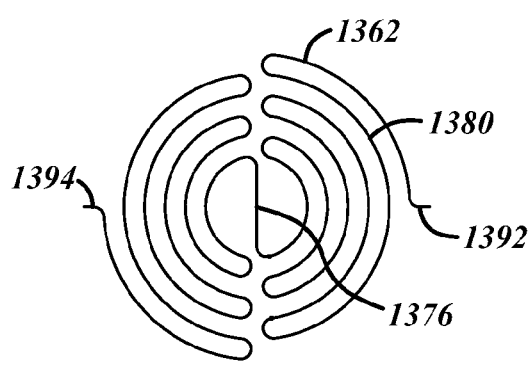

FIG. 23 illustrates another example of a discontinuous layer 1362 made from a single wire form 1380. The wire form 1380 includes serpentine-like shapes beginning at end 1392, extending back and forth along gradually smaller arcuate portions radially toward the central contact portion 1376, and then extending back and forth along gradually larger arcuate portions radially toward the intended periphery and end 1394. In this example, the ends of the wire form 1380 do not include bends, but extend slightly beyond the intended periphery of the metering chamber where they may fit into complimentary slits or slots formed in the continuous layer and/or the gasket about the periphery of the chamber.

Figure 24:
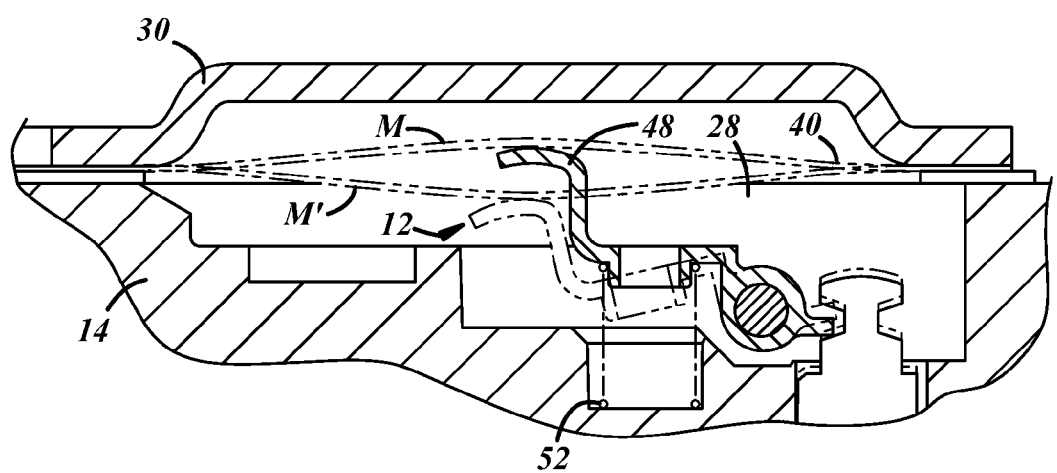
FIG. 24 is a partial cross-sectional view of a carburetor with another embodiment of a diaphragm metering system.

In FIG. 24, one implementation of a metering system 12 is illustrated that utilizes a larger portion of the overall movement of the metering diaphragm 40 than is conventional. In this example, the metering lever 48 is constructed and arranged so that it is in contact with the metering diaphragm 40 for a majority of the total range of movement of the diaphragm 40. The metering diaphragm 40 is depicted as a single layer of material in FIG. 24, as this arrangement is applicable to metering diaphragms with any number of layers, with or without a discontinuous layer. The range of movement of the diaphragm 40 corresponds to the difference in diaphragm location from a minimum to a maximum operating volume for the metering chamber 28. In FIG. 24, the maximum operating volume of the metering chamber 28 is reached when the diaphragm 40 is at position M (high pressure chamber condition), and the minimum operating volume of the metering chamber 28 is reached when the diaphragm is at position M' (low pressure chamber condition). The metering lever 48 is configured so that it extends past the midpoint of the total range of movement when the metering valve is closed in order to utilize more than half of the total diaphragm stroke. In an alternative configuration, the diaphragm includes a contact portion that remains in contact with the metering lever 48 for the majority of the diaphragm stroke whether or not the metering lever 48 ever extends past the midpoint of the stroke.

This type of configuration may be particularly useful with certain diaphragm constructions that do not necessarily include an annular convolution or a bagged portion. For example, layered diaphragm constructions such as those described above facilitate the use of diaphragm materials such as PTFE with increased resistance to modern fuels compared to rubber-based materials. As a continuous layer 60 in film form, however, such materials may not be as flexible as rubber-based materials, particularly in the absence of a convolution, thus reducing the range of movement of the diaphragm. Utilizing a majority of the range of movement of the diaphragm 40 as shown in FIG. 24 or in a similar manner can help ensure proper uncorking of the metering valve during purging at start-up. In one embodiment, the metering lever 48 or other metering system component is attached to the diaphragm 40 so that all of the range of movement of the diaphragm 40 is utilized.

Figure 25:
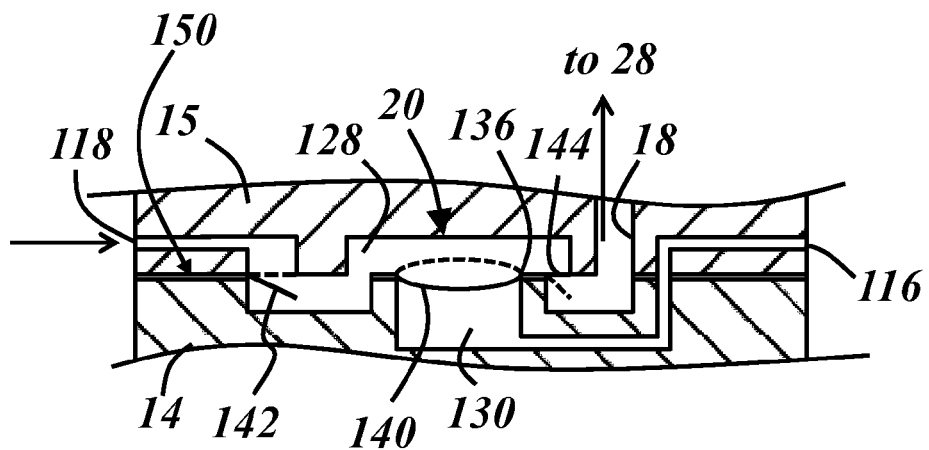
FIG. 25 is a partial cross-sectional view of a carburetor with a diaphragm fuel pump.

Turning now to FIG. 25, there is shown a cross-section of one example of a diaphragm fuel pump 20 to demonstrate another useful implementation of a layered diaphragm. The particular fuel pump 20 shown in the figure is formed between the main body 14 and the intermediate body 15 of the carburetor, as described in connection with FIG. 2. Here, diaphragm 140 separates a pump chamber 128 from a pulse chamber 130, with opposite sides of the diaphragm each defining a portion of the pump and pulse chambers. The pulse chamber 130 alternates between high and low pressure states through fluid connection with a pulse source, such as an engine crankcase, via passage 116. The illustrated fuel pump is shown with the pulse chamber 130 in the low pressure state so that the diaphragm 140 is deflected in a direction that increases the volume of the pump chamber 128. In response, fuel flows from an external source into inlet 118, through open inlet valve 142, and into the pump chamber 128, during which time outlet valve 144 is closed. The dashed lines of FIG. 25 depict the diaphragm 140 and the valves 142, 144 in their respective positions when the pulse chamber is at the high pressure state. At the high pressure state, the inlet valve 142 closes, the outlet valve 144 opens, and the diaphragm 140 deflects in a direction that decreases the volume of the pump chamber 128, resulting in fuel flow from the pump chamber to passage 18 and toward the metering chamber 28 (not shown).

The fuel pump diaphragm 140 is shown schematically here as a layer of material that is fixed at a periphery 136 of one or both of the pump and pulse chambers 128, 130. For example, one or more layers of the diaphragm 140 may be clamped between bodies 14, 15 as many of the above-described metering diaphragms are clamped between a carburetor body and cover. In accordance with the above-described metering diaphragms, the fuel pump diaphragm 140 may include a continuous layer and a discontinuous layer and realize at least some of the same advantages. Here, the pump chamber 128, fuel pump diaphragm 140, and inlet valve 142 are respectively analogous to the metering chamber, diaphragm, and metering valve of the above-described metering systems. Similarly, the fuel pump diaphragm 140 may include a discontinuous layer that is attached at the periphery 136 of either or both chambers 128, 130 that can impart the diaphragm with a resistance to movement dependent on one or more factors, such as the amount of diaphragm movement or the presence, application, and/or magnitude of an electric or magnetic field. The diaphragm 140 can include a discontinuous layer with one or more slots, conductive portions, wireforms, etc. Rather than being attached at periphery 136, the discontinuous layer of the fuel pump diaphragm may lie entirely within the periphery of chambers 128, 130. For example, the discontinuous layer may be a thin layer of metal adhered to, plated onto, or otherwise affixed to the continuous layer of the fuel pump diaphragm.

For example, a discontinuous layer with a conductive portion may be configured to affect fuel pump diaphragm movement independently or complimentary to the movement induced by the pulse source. In one embodiment, the fuel pump diaphragm is configured to operate—i.e., to deflect back and forth to pump fuel through the pump chamber 128—in the absence of a pulse source. In other words, the diaphragm 140 may include a discontinuous portion that moves in response to an applied magnetic or electric field, and the application of the field can be controlled to control diaphragm movement and fuel pump operation. The fuel pump diaphragm 140 does not necessarily contact other moving components like the analogous metering diaphragm does (i.e., the metering lever), and the discontinuous layer can thus be located on either the pump chamber side of the diaphragm or on the opposite side of the diaphragm, or on both sides. This may also eliminate any need for a contact portion of the discontinuous layer.

Figure 26:
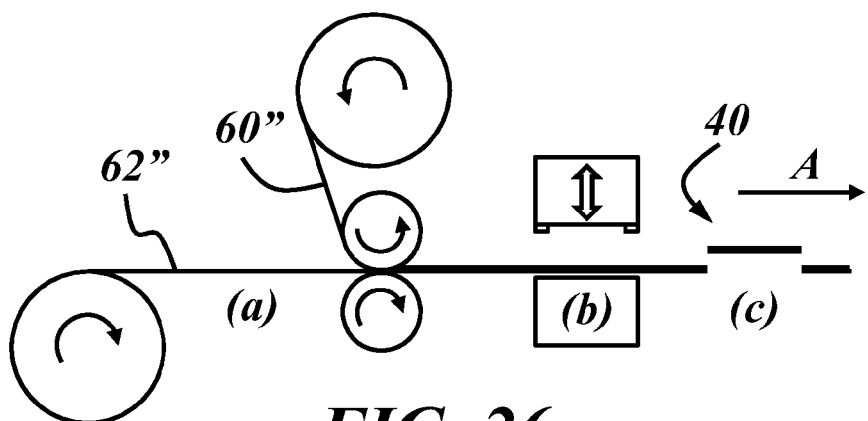
FIG. 26 is a side view of an illustrative process for making a diaphragm subassembly.
Figure 27:
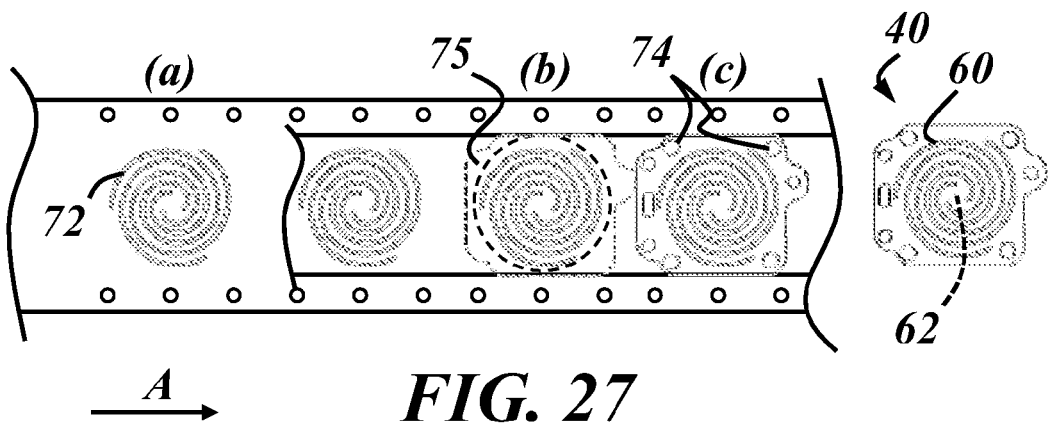
FIG. 27 is a plan view of the process of FIG. 26.

Referring now to FIGS. 26 and 27, there is shown an illustrative process for making a metering diaphragm 40 having a continuous layer 60 and a discontinuous layer 62. This process is applicable to multi-layer pump diaphragms as well. FIG. 26 is a side view of the process, and FIG. 27 is a plan view. In this process, layers 60 and 62 are attached together as a subassembly and/or are manufactured together rather than being provided as separate pieces. In this example, the materials 60" and 62" for both of the layers 60 and 62 are provided in strip or sheet form and fed in a machine direction A. Material 62" is fed in direction A and slots 72 are formed through the material at step (a), along with indexing or alignment holes arranged along the edges of the material. In this embodiment, the slots 72 are in the spiral configuration of FIG. 5. Material 60" is then fed to overlap with material 62", between the indexing holes in this example. The material 60" may include a layer of adhesive on the side that opposes and contacts the material 62". The adhesive may be, for example, pressure sensitive and/or heat activated.

A bonding tool presses the two materials together at step (b). The bonding tool is configured so that pressure and/or heat is applied to an area of the overlapping materials that is outside of the formed slots 72. In this example, heat and/or pressure is applied within area 75—i.e., the area between the dashed lines in FIG. 27. The diaphragm 40 is then cut to shape from the layered and bonded materials at step (c), at which time other holes or locating features 74 may also be formed. The finished diaphragm 40 as oriented in FIG. 27 has the continuous layer 60 on top and the discontinuous layer 62 on bottom.

Consistent with the above description, the respective materials 60" and 62" may be selected with their individual functions in mind. For example, material 60", which forms the continuous layer 60, may be a thin, flexible layer with high resistance to hydrocarbon fuels with or without alcohol content. In one example, the material 60" is a film comprising a fluorinated polymer such as PTFE, perfluoroalkoxy (PFA) or fluorinated poly(ethylene-propylene) (FEP). In one embodiment, the film 60" is about 0.001" in thickness, but may vary depending on the material type and other factors. Where included, the adhesive layer may have a heat activation temperature below the softening point, melting point and/or glass transition temperature of the material 60" so that it can be heat-activated without melting, shrinking, or otherwise damaging the material. The adhesive layer may also be selected to be soluble in the particular fuel to be used in the carburetor assembly so that excess adhesive is removed from between the layers 60, 62 during carburetor operation. One suitable adhesive layer material is an acrylic-based adhesive. Material 62" may be metallic, such as stainless steel or aluminum, or polymeric, such as Mylar® or other polyester-based film. In one embodiment, the material 62" is a polymeric film having a thickness of about 0.010".

Where employed, the adhesive layer may be included with the discontinuous layer material 62" in addition to or instead of the continuous layer material 60". If it is desired to include a bagged portion (such as portion 65 of FIG. 3) in the continuous layer 60, the discontinuous layer material 62" can be formed with a dome or raised portion at step (a) or some other step prior to bringing the continuous layer material 60" into contact therewith so that the thinner continuous layer material is stretched over the formed material 62". The illustrated process is illustrative, as some steps may be omitted and/or additional steps may be added. For example, a tape or other temporary attachment may be used to hold the two layers of material 60", 62" together prior to bonding. The bonding may be performed without adhesive, such as by heat staking, ultrasonic welding, or any other suitable technique, and it is not always necessary to achieve a full surface bond outside of the slotted portion of the discontinuous layer 62.

The process provides a diaphragm assembly that can be easily handled in a manufacturing environment. With the multi-layer diaphragm described herein, where individual layers of the diaphragm may be made to perform their individual functions better than any single layer could perform the combined functions, material handling during manufacturing may be a new consideration. For example, the above-described diaphragm may employ a very thin polymeric film as the continuous layer, and such thin layers can be difficult to handle—i.e., a 0.001" layer of polymer may easily fold or wrinkle and static charges can develop if handled as a separate piece. Providing the diaphragm 40 as a bonded or laminated subassembly that includes the discontinuous layer as well can provide a sturdier piece for handling in the carburetor manufacturing environment.

Figure 28:
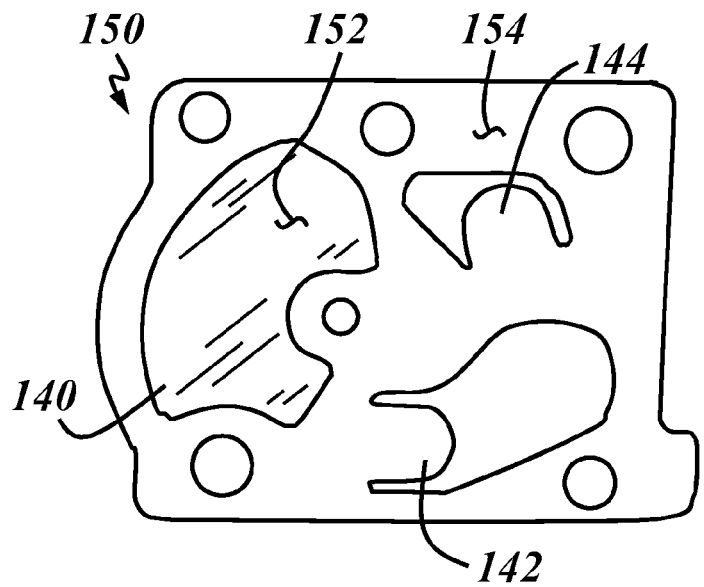
FIG. 28 is a plan view of a dynamic portion of a diaphragm fuel pump, including a diaphragm and flapper valves.
Figure 29:
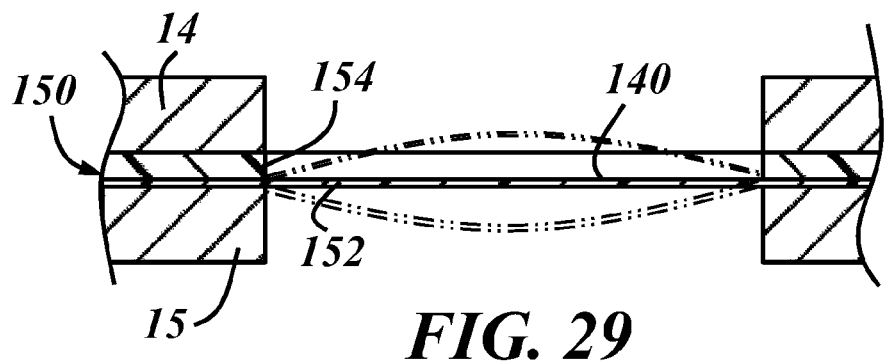
FIG. 29 is a cross-sectional view of the diaphragm of the component of FIG. 28 when installed in a carburetor.
Figure 30:
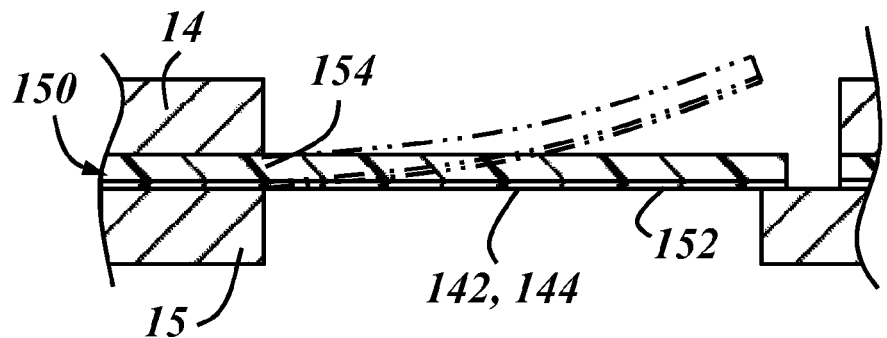
FIG. 30 is a cross-sectional view of one of the flapper valves of the component of FIG. 28 when installed in a carburetor.

FIGS. 28-30 illustrate a dynamic portion 150 of a diaphragm fuel pump. When assembled (see FIG. 25), the dynamic portion 150 is clamped between two fuel pump bodies 14, 15 and includes the fuel pump diaphragm 140 and one or more valves 142, 144, where the valves are flapper valves. The illustrated dynamic portion 150 is a multi-layer assembly and may be manufactured in a manner similar to that shown in FIGS. 26 and 27, with or without a discontinuous portion included with the diaphragm 140. The multi-layer dynamic portion 150 may realize some of the same advantages as the examples of multi-layer diaphragms described above in that each layer can be constructed with its individual function in mind.

FIG. 28 shows the dynamic portion 150 in plan view, FIG. 29 is a cross-sectional view of the diaphragm 140 when assembled into the carburetor, and FIG. 30 is a cross-sectional view of a flapper valve 142, 144 when assembled into the carburetor. The dynamic portion 150 includes a sealing layer 152 and a support layer 154. As shown in FIG. 29, a portion of the sealing layer 152 becomes the diaphragm 140 when clamped between carburetor bodies 14, 15, separating the pump and pulse chambers of the fuel pump. As shown in FIG. 30, other portions of the sealing layer 152 become the sealing or valve seat side of each flapper valve 142, 144. The support layer 154 is omitted at the diaphragm 140 in this example and is present on the opposite or non-sealing side of each valve 142, 144. This configuration allows the diaphragm 140 to be formed from a relatively thin and flexible film or membrane, for increased response to pressure differentials, while the valves 142, 144 can be formed with sufficient operating integrity.

For example, sealing layer 152 can be formed from a thin polymeric film with good resistance to hydrocarbon fuels, ethanol, water, and acid to fulfill the requirements for diaphragm 140. In one embodiment, the sealing layer 152 is a fluorinated polymeric film, such as PTFE, PFA or FEP, with a thickness ranging from 0.001"-0.002". Taken alone, such a thin polymeric membrane may have difficulty functioning as a flapper valve or may not be strong enough for repeated cycling, due to lack of rigidity or structure. Support layer 154 can provide the flapper valves 142, 144 with sufficient stiffness or integrity. The support layer can be a layer of metallic or polymeric material (e.g., stainless steel, aluminum, Mylar, Delrin, etc.) having a thickness sufficient to provide the valves 142, 144 with enough stiffness or integrity to open and close properly. In one embodiment, the support layer 154 is a layer of polymeric film having a thickness of about 0.005". The support layer 154 also provides the dynamic portion 150 of the fuel pump with sufficient integrity to be handled in a manufacturing environment without easily folding or wrinkling, as may be the case if the dynamic layer was a single layer of flexible polymeric film optimized for diaphragm flexibility.

The dynamic portion 150 can be made in a process similar to that shown in connection with the metering diaphragm process of FIGS. 26 and 27, where the support layer 154 first has an opening formed therethrough corresponding to the outer periphery of the diaphragm 140, and the sealing layer 152 is subsequently bonded with the support layer prior to the final dynamic portion 150 being cut from the layered materials.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A carburetor having a metering system that controls fuel flow from a fuel source to an air-fuel passage, the metering system comprising:
    a metering diaphragm sealed to a body of the carburetor to at least partly define a metering chamber between the metering diaphragm and the body, the metering diaphragm comprising a continuous layer and a discontinuous layer;
    wherein the continuous layer is responsive to fluid pressure within the metering chamber and moves against the discontinuous layer to open a metering valve to allow fuel flow from the fuel source and into the metering chamber when said fluid pressure is below a reference pressure.

2. The carburetor of claim 1, wherein the discontinuous layer is affixed to the carburetor body at or within a periphery of the metering chamber.

3. The carburetor of claim 1, wherein the discontinuous layer has a resistance to movement that varies according to its amount of movement.

4. The carburetor of claim 1, wherein the one or both of the continuous layer and the discontinuous layer includes a conductive portion so that an applied electric or magnetic field affects the movement of the metering diaphragm.

5. The carburetor of claim 1, wherein the discontinuous layer includes a void, a segment, or a wire form.

6. The carburetor of claim 1, wherein the discontinuous layer includes dissimilar materials.

7. The carburetor of claim 1, wherein the metering diaphragm has a range of movement corresponding to a minimum metering chamber volume and a maximum metering chamber volume during operation, and the metering diaphragm is in contact with a metering lever for a majority of said range of movement.

8. The carburetor of claim 1, wherein the discontinuous layer includes a conductive path configured so that adjacent portions of the conductive path carry electric current in opposite directions from each other when a voltage is applied across the conductive path.

9. The carburetor of claim 4, wherein the conductive portion is a conductive path configured for application of a voltage across the conductive path.

10. The carburetor of claim 9, wherein the conductive portion is ferromagnetic.

11. The carburetor of claim 1 wherein the continuous layer includes a bagged portion having a thickness less than the nominal thickness of the layer and/or an increased surface area compared to the area of the region if it was flat and without a bagged portion.

12. The carburetor of claim 1 wherein the continuous layer has a thickness in the range of 0.001" to 0.010".

13. The carburetor of claim 1 wherein the discontinuous layer has a thickness in the range of 0.003" to 0.040".

14. The carburetor of claim 1 wherein the continuous layer does not include any opening formed therethrough for attachment of another component to the continuous layer.

15. The carburetor of claim 1 wherein segments of the discontinuous layer within a perimeter of the fuel chamber are in a symmetrical pattern.

16. The carburetor of claim 1 wherein the discontinuous layer has a plurality of segments and at least one of the plurality of segments has a spiral pattern and is connected to a contact portion.

17. The carburetor of claim 1 wherein the discontinuous layer of material comprises a polyacetal, polyester, steel, stainless steel, or aluminum.

18. The carburetor of claim 1 wherein the continuous layer of material comprises perfluoroalkoxy (PFA), polytetraflouroethylene (PTFE), fluorinated Ethylene Propylene (FEP), polyesters, fluoroelastomers, low density polyethylene, nitrile rubber, or polyurethanes.

19. The carburetor of claim 17 wherein the continuous layer of material comprises perfluoroalkoxy (PFA), polytetraflouroethylene (PTFE), fluorinated Ethylene Propylene (FEP), polyesters, fluoroelastomers, low density polyethylene, nitrile rubber, or polyurethanes.

20. A method of making a carburetor having a fuel metering system with a metering diaphragm, the method comprising the steps of:
    forming a metering diaphragm with a discontinuous layer and a continuous layer overlying the discontinuous layer;
    providing at least part of the discontinuous layer of the metering diaphragm with a conductive portion that is responsive to an electric field, a magnetic field, or both; and
    communicating with the conductive portion a source of an electric field, a magnetic field or both so that said electric field, magnetic field or both is capable of being applied to the conductive portion.

21. The method of claim 20, wherein the conductive portion is a conductive path and the method comprises applying a voltage across the conductive path.

22. The method of claim 20, further comprising the step of inducing opposing magnetic fields in adjacent portions of the conductive path, thereby causing at least a portion of the metering diaphragm to move in response to the applied magnetic fields.

23. The method of claim 21, further comprising the step of selecting a voltage applied to the conductive portion to impart the diaphragm with a desired characteristic spring rate.

24. The method of claim 20, wherein the conductive portion is ferromagnetic and the method further comprises selecting a magnetic field strength to impart the diaphragm with a desired resistance to movement.

25. A method of making a carburetor including a diaphragm, comprising the steps of:
    forming an opening through a sheet of a first material;
    bonding a sheet of a different second material with the sheet of first material so that the second material overlies the formed opening; and
    clamping the bonded sheets between first and second carburetor bodies outside of the formed opening so that the second material moves in response to a fluid pressure differential on opposite sides of the bonded materials.

26. The method of claim 25, wherein the diaphragm is a metering diaphragm having a continuous layer formed from the second material and a discontinuous layer formed from the first material, and the step of clamping defines a metering chamber on one side of the bonded materials.

27. The method of claim 25, wherein the step of clamping defines a pump chamber of a diaphragm fuel pump on one side of the bonded materials so that the diaphragm is part of a dynamic portion of the fuel pump, said dynamic portion comprising a flapper valve comprising both of the first and second materials.

28. The method of claim 25, comprising the steps of:
forming a plurality of openings through the sheet of the first material to provide a plurality of segments of the first sheet to be within a perimeter of a fuel chamber and attached to a portion of the first sheet outside of such perimeter and extending around such perimeter;
bonding a continuous sheet of the different second material with the sheet of the first material so that the continuous sheet overlies the formed openings and extends outward of such perimeter.

29. The method of claim 25 comprising, forming the metering diaphragm with a conductive portion that is responsive to an electric field, a magnetic field, or both and the step of communicating with the conductive portion a source of an electric field, a magnetic field or both so that said electric field, magnetic field or both is capable of being applied to the conductive portion.

30. The method of claim 29 further comprising the step of either 1) inducing opposing magnetic fields in adjacent portions of the conductive portion, thereby causing at least a portion of the metering diaphragm to move in response to the magnetic fields, or 2) applying a voltage across the conductive portion to impart the diaphragm with a desired characteristic spring rate.

31. A carburetor, comprising:
first and second bodies;
a fuel chamber located between the first and second bodies;
a multilayer subassembly clamped between the first and second bodies, the multilayer subassembly comprising a first layer of material and a second layer of a different material bonded with the first layer of material; and
a fuel flow valve that opens and closes to allow fuel flow into or out of the fuel chamber;
wherein the first layer of material flexes to selectively actuate the fuel flow valve, and the second layer of material defines a portion of the fuel chamber and moves in response to a pressure differential across the second layer of material.

32. The carburetor of claim 31, wherein the fuel chamber is a metering chamber, the multilayer subassembly is a metering diaphragm, the first layer is a discontinuous layer that flexes and engages a metering valve, and the second layer is a continuous layer that defines a portion of the metering chamber.

33. The carburetor of claim 31, wherein the fuel chamber is a pump chamber of a diaphragm fuel pump, the multilayer subassembly is a dynamic portion of the fuel pump, the first layer is a support layer that flexes during operation of a flapper valve, and the second layer is a continuous layer that defines a portion of the pump chamber.

\* \* \* \* \*